UNITED STATES PATENT OFFICE.

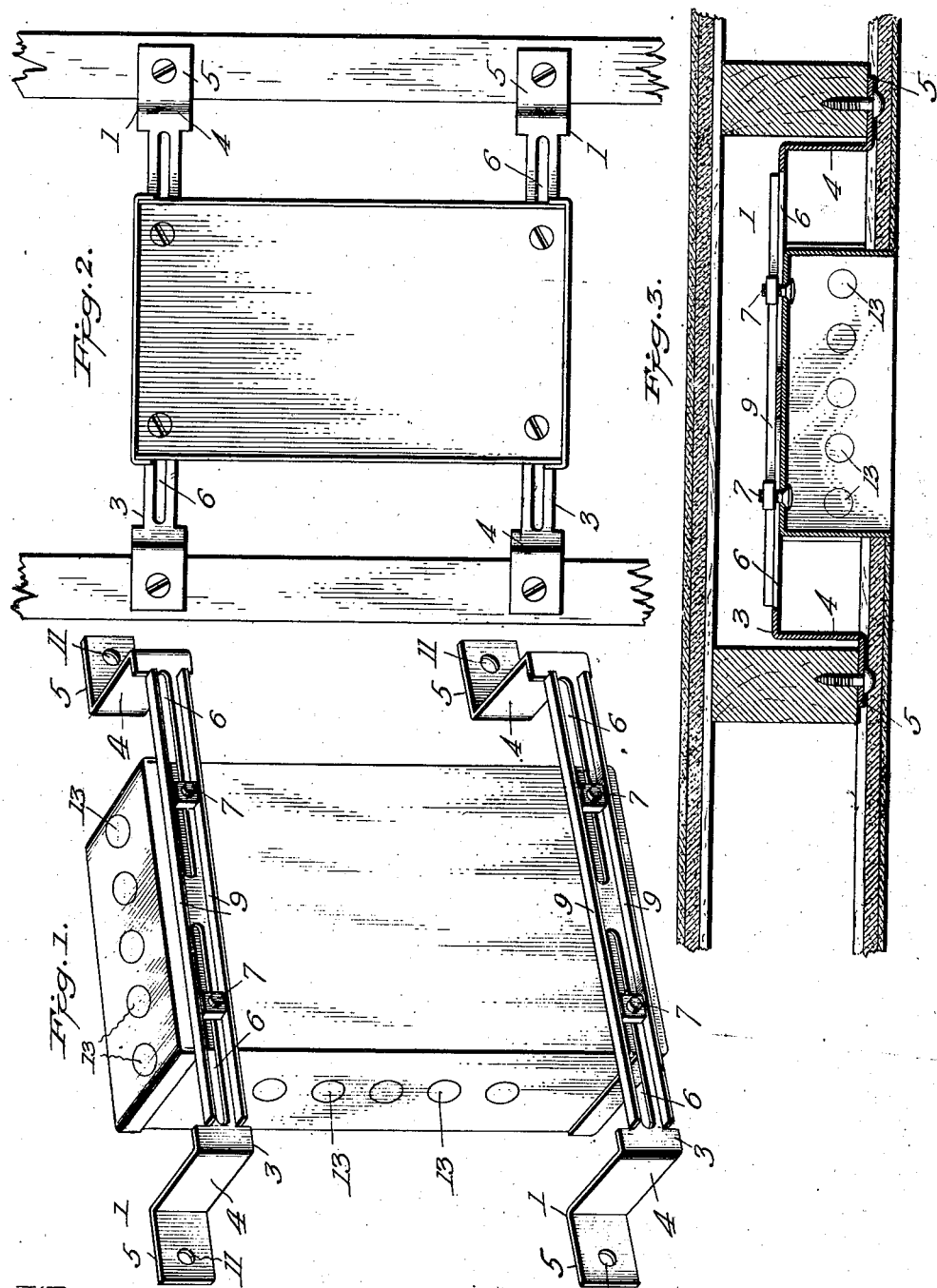

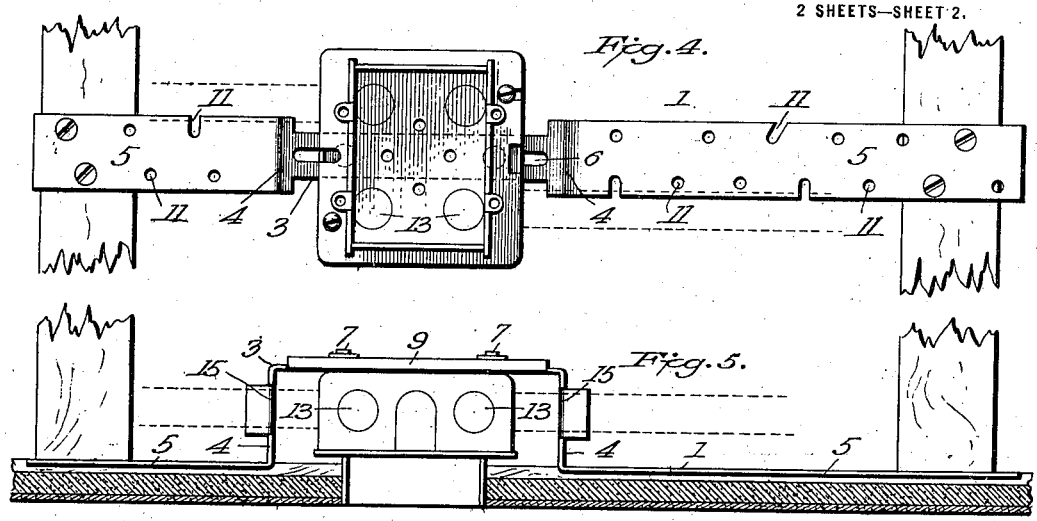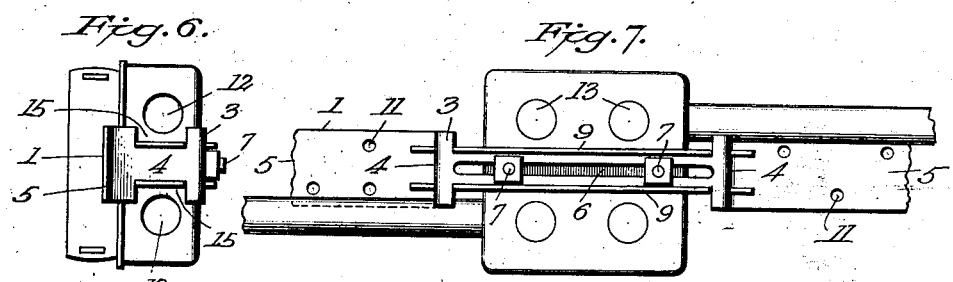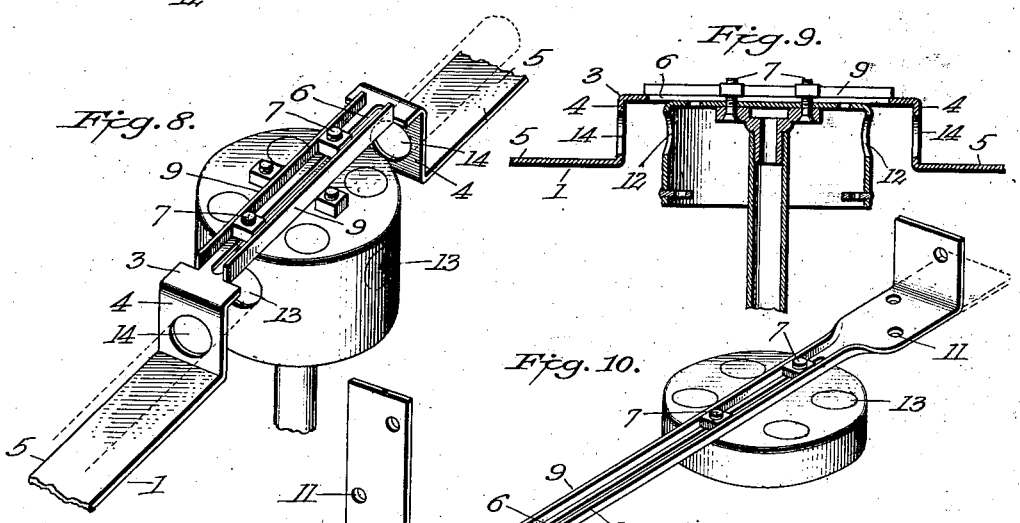

JAMES C. CAINE, OF DENVER, COLORADO, ASSIGNOR OF ONE-HALF TO THE NEW ENGLAND ELECTRIC COMPANY, OF DENVER, COLORADO, A CORPORATION OF COLORADO.

OUTLET-BOX BRACKET.

1,156,885.   Specification of Letters Patent.   Patented Oct. 19, 1915.

Application filed December 12, 1911. Serial No. 665,360.

*To all whom it may concern:*

Be it known that I, JAMES C. CAINE, a citizen of the United States of America, residing in the city and county of Denver and State of Colorado, have invented a new and useful Outlet-Box Bracket, of which the following is a specification.

My invention relates to a new article of manufacture and it comprises an adjustable fire-proof supporting bracket for the iron cabinets, outlet-boxes and switch-boxes employed in the electric circuit wiring of office buildings, residences and all other buildings in cities, the building regulations of which are based on the laws of the National Board of Fire Underwriters and the objects of my invention are: First, to provide a fire-proof supporting bracket, for supporting electrical wiring outlet-boxes, switch-boxes and cabinets between ceiling, joist, iron beams and wall studding members. Second, to provide a fire-proof supporting bracket for adjustably supporting electrical wiring, cabinet, outlet and switch boxes in predetermined positions between joist and iron beams and studding members of buildings. Third, to provide a fire-proof supporting bracket for adjustably supporting lengthwise of the bracket the cabinet outlet and switch boxes used in electric wiring systems of buildings for holding electric light chandeliers, electric lamp brackets, drop and wall lamps and switches and for supporting them in such an operative position relative to the ceilings and walls of rooms that when the ceilings and walls are plastered the outer edge of the cabinet or box will be practically even and flush with the finished surface of the plastered wall. I attain these objects by the mechanism illustrated in the accompanying drawings in which:

Figure 1 is a perspective view showing the form of supporting bracket used in connection with outlet boxes, a pair of such brackets being illustrated with an outlet box adjustably secured thereto. Fig. 2 is a front view of the arrangement shown in Fig. 1, the brackets being shown secured to partition studding. Fig. 3 is a horizontal sectional view through a portion of a partition showing the bracket and the box mounted thereon. Fig. 4 is a front view of a bracket secured upon partition studding, and which is capable of lateral adjustment with respect to the studding, this form of bracket being used in connection with a switch-box, as illustrated, the ends of the saddle portion of the brackets being recessed or cut away, to permit of the insertion of the ordinary wire holding pipes or conduits into the knockout holes in the sides of the said switch-box. Fig. 5 is a horizontal sectional view of a portion of a partition, showing the arrangement of box and bracket illustrated in Fig. 4, wire pipes leading from the box being shown in dotted lines. Fig. 6 is an end view of the box and bracket shown in Figs. 4 and 5, showing the recesses in the ends of the saddle portion of the bracket, which permits the insertion of wire holding pipes into the box. Fig. 7 is a rear view of the same, showing wire pipes extending from opposite ends of the box through the recesses in the ends of the saddle. Fig. 8 is a perspective view, showing a bracket especially adapted for outlet-boxes, the ends of the saddle portion of said bracket being apertured for the reception of the wire holding pipes. Fig. 9 is a vertical, sectional view of the same showing the manner of connecting the usual chandelier supporting tube thereto. And Fig. 10 is a perspective view, illustrating a form of bracket used in connection with a shallow outlet as shown, or one which is not inclosed within the ceiling.

Similar letters of reference refer to similar parts throughout the several views.

Referring to the drawings, my adjustable fireproof supporting bracket consists of a thin bar or strip 1, of iron or any other suitable metal or fire-proof material. This bar is made of a width that will enable it to be secured rigidly to the wooden or iron ceiling beams of rooms or to the partition studding of walls, and at the same time not interfere with the circuit wire conduit pipes that connect to the cabinet, or outlet, or switch box it is adapted to support, which hereinafter I will term the outlet-box. This supporting bar is preferably made of thin rolled sheet iron, and the opposite end portions are arranged to rest against the under side edges of the ceiling beams of rooms or against the outer edges of vertical partition studding, and in the preferred construction of my fire-proof outlet-box supporting bracket the bar is provided with an offset portion 3, which I will call its saddle portion. This saddle portion 3, is formed by bending a portion of the bar between its ends with right or other angled side portions 4, and then again bending the angled side portions 4, to form a flat straight portion 5, between the angled side portions 4 and the ends of the bar. This flat saddle portion is always made enough longer in length than the outlet-box that is to set on it, to permit the outlet-box to be horizontally moved and set in an adjusted position thereon, and along the central portion of its length a longitudinal slot is cut through it and extends through its length, or in the case of long saddle portions two slots may be made at a short distance apart as shown in Fig. 1. This slot is formed to receive loosely and slidably the body of the screw bolts 7, that are used to secure the cabinets and outlet-boxes to the saddle portion of the bracket, and inasmuch as these bolts project through this slot and beyond this saddle part of the bracket and their nuts cannot be reached to be held against turning when the screws are turned and tightened from the inside of the outlet-box to clamp the outlet-box to the saddle, some means must be provided for holding those nuts against any turning movement when the body of the screws are turned.

My invention contemplates any means for holding the nut portion of the bolt from turning when the body of the screw is turned from the inside of the box. I preferably however, carry out this feature of my invention in the following manner: The opposite end portions of the saddle portion are provided with short shearing cuts, which cuts are made adjacent to the opposite ends of the slot, and the edges 9, of the metal along the opposite edges of the saddle portion of the bracket that are freed at their ends by these shear cuts, are bent backwardly toward the rear side of the saddle portion of the bracket until they are each at an equal distance from the slot and are close enough to it to leave between them a channel in which the nuts of the bolts are placed and between which they fit slidably, and with the sides of the channel positioned so close to the bolts that it is impossible for them to turn. These turned-down portions 9 of the saddle also act to truss and consequently strengthen the saddle member of the bracket. Flat screw-driver headed bolts are preferably used in the bottoms of the outlet-boxes for securing them to the saddle portion of the bracket, and these screw-driver head portions of the bolts set into countersunk holes in the bottoms of the outlet-boxes, and the nuts of these bolts are placed between the turned-down edges of the bracket, although any kind of bolt may be used either within or along the sides of the boxes, and the heads may be placed in the saddle and the nuts be turned from the outlet-box side of the saddle, if preferred. The opposite side edges of the opposite end portions of the bracket are each provided with a row of openings 11, which may be apertures or slots or both, and they are adapted to receive nails, screws or binding wire to secure the bracket to the edges of wooden or metal studding, floor joists or iron beams. These openings are placed close enough together, by placing one row in zig-zag or staggered relation to the opposite row to insure that an opening on each side of the saddle portion will register with the edges of a pair of joists or beams or of studding, no matter if they vary from the usual distances at which studding and floor joist in buildings is placed, which is generally 16 in. for partitions and 12 inches for ceiling joist; but my brackets are made to not only fit these generally used spacings of wall studding and ceiling joists, but can be made for any spacing of these members.

My offset saddle form of bracket is adapted to be used on plastered ceilings and walls, and the offset portion of the saddle part of the bracket is made to correspond to the depth of the outlet-boxes used, and is made of such a relative depth to the depth of the cabinet or box to always bring the outer open edges of the cabinet or box just even with the plastered wall when finished, and they are arranged in such relative position to the ends of the brackets as to allow the usual thickness of first, second and third or finishing coats of plastering mortar to be applied on the lathing over the edge surfaces of the studding or ceiling joist, as is illustrated in Fig. 3.

The pipes may approach or extend from the cabinets or outlet-boxes in any desired direction. They are, however, as a rule arranged either horizontally across or vertically along and substantially parallel with the joist or wall studding members, and in order that horizontally positioned pipe conduits may be easily extended from the cabinets or boxes in central, horizontal planes, I provide the angled ends offset portions 4 with apertures 14, of a size to permit the conduit pipes to be passed through them loosely from opposite sides of the cabinets or boxes. These conduit pipes then extend along under the end portions of the brackets, and the ends of the brackets are made wide enough to permit the oppositely arranged rows of nail or screw receiving openings to be positioned far enough apart and also from each side of the center of the width of the bracket to permit fastening members to be inserted in the joist or studding by straddling the pipe and without striking it.

In Fig. 6, I illustrate the opposite side edges of the angled offset portions 4, of the bracket folded back away from the saddle portion in order to form recesses 15, in them on each side of the remaining central portion of their widths. These recesses are adapted to receive a wire conduit pipe on each side of the central angled portion. Where these angled portions are provided with knockout apertures, they may be stamped out and then plugged up with the disk of material that was stamped out from them.

In Figs. 4 and 5 I illustrate a bracket, the joist or studding engaging ends of which are of unequal lengths. My invention contemplates brackets of this irregular form in order to meet the requirement of placing an outlet-box quite close alongside of a joist or stud, which arrangement requires a short joist engaging end portion at one end and a long joist engaging end portion at its opposite end. This form of bracket can be reversed end for end, and the cabinet or box positioned as close as desired to either one or the other of the joists or studs between which it is secured, or at any point on either side of a central position between them.

In Fig. 10, I illustrate by the dotted extension of the full lines of this figure a simplified version or modification of the preferred construction of my bracket, in which the saddle portion is omitted. The horizontal slideway 9, for the screw bolts of the cabinet or boxes is present, however, and the side edges of the bracket are turned downwardly to form a slideway for the nuts and hold them from turning. This straight form of bracket is adapted for use on exposed joist or stud members where the outlet-boxes project wholly outside of them, and in this Fig. 10 I also illustrate this form of bracket provided with turned or bent around terminal ends that stand at right angles to the length of the bracket. This form of bracket is adapted to be used in old or completed plastered residences and buildings where it is desired to insert an outlet-box into the wire circuit system installed therein. This is accomplished by cutting a hole through plastering and lathing and inserting the bracket shown in Fig. 10, that has the bent around ends which are secured to the sides of the joist, beams or studding members.

My fire proof supporting bracket can be stamped, pressed, punched or otherwise made complete at any properly equipped metal working shop and it can be made in the various sizes and shapes required to support outlet-boxes in positions that will bring their edges in the right position to be even with the plastering when it is applied after the bracket and outlet-box are secured permanently in place. Consequently the brackets can be made in duplicate lots of large numbers and may be, when desired, permanently bolted to the boxes in the shop. Consequently, all that is required to place my brackets in operative outlet-box supporting positions is to hold them up against the edges of two adjacent joists, beams or wall studding members and insert nails or screws or wire in their fastening openings and secure them firmly to the joist, beams or studding. In case the brackets are put in place first and the outlet-boxes afterward, the outlet-box is laid against the saddle, and the nuts of the bolts are placed in the slot formed in the turned back edges of the saddle to receive them, and then the bolts are turned from the inside of the outlet-box into the nuts, and after adjusting the box along the slot to the position desired between the joist, beams or studs, the bolts are tightened to rigidly secure the outlet-box in its adjusted position to the bracket. Another advantage of my metal support is that owing to its being made of thin sheet metal, it can be easily and quickly bent to conform to any unevenness that may exist in the positions or in the surfaces of the joists or studding. The bracket is secured in place, so that the top edge of the open end of the box will come substantially even with the surface of the finished wall the saddle portion of the bracket being of a depth relative to the depth of the box that is used with it to allow for the lathing and the usual depth of mortor used in plastering ceilings and walls of buildings.

My invention is simple, strong and fireproof, and can be very quickly and correctly placed in buildings, and while I have illustrated and described the preferred construction and arrangement of my fire-proof outlet-box supporting bracket, I do not wish to be limited to the construction and arrangement shown, as many changes might be made without departing from the spirit of my invention.

Having described my invention, what I claim as new and desire to secure by Letters Patent is:

An integral outlet-box bracket having end-securing portions and an intermediate, longitudinally slotted offset portion forming an outlet-box seat, screw-bolts and nuts for adjustably securing the outlet-box within said offset portion and longitudinal ribs struck up from the metal of the offset portion and at right-angles thereto and providing a locking channel for the securing nuts.

In testimony whereof I affix my signature in presence of two witnesses.

JAMES C. CAINE.

Witnesses:
 G. SARGENT ELLIOTT,
 ELIZABETH SMITH.